Figure 1:
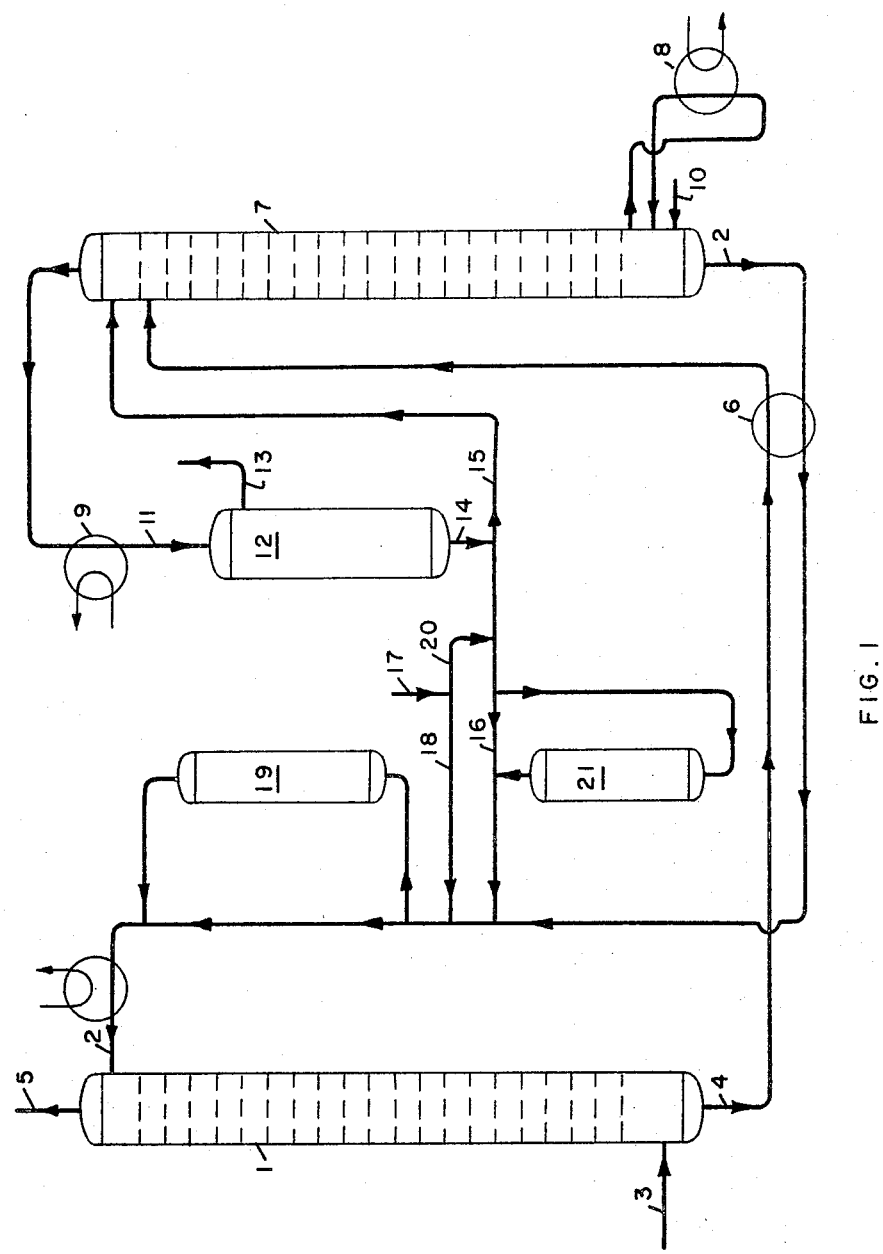

Aug. 16, 1966     A. P. BALLY ETAL     3,266,866

SELECTIVE HYDROGEN SULFIDE ABSORPTION

Filed June 7, 1962     2 Sheets-Sheet 1

INVENTORS
ADRIANUS P. BALLY
WILLEM G.J. VAN DIJK
BY William H. Myers
THEIR AGENT

3,266,866
SELECTIVE HYDROGEN SULFIDE ABSORPTION

Adrianus P. Bally and Willem G. J. van Dijk, The Hague, Netherlands, assignors to Shell Oil Company, New York, N.Y., a corporation of Delaware
Filed June 7, 1962, Ser. No. 200,714
Claims priority, application Great Britain, June 27, 1961, 23,307/61
4 Claims. (Cl. 23—2)

The invention relates to a process for the selective removal of hydrogen sulfide from gases that contain hydrogen sulfide and carbon dioxide, and possibly one or more other gaseous components.

The gases to be treated in accordance with the present invention contain both hydrogen sulfide ($H_2S$) and carbon dioxide ($CO_2$) and possibly one or more other components, such as hydrogen, carbon monoxide, low boiling hydrocarbons, sulfur dioxide, nitrogen, oxygen, etc. Suitable starting materials are, for example air gases obtained by complete or partial combustion of oil or coal, oil refinery gas, town gas, coke oven gas, water gas, propane, propene.

The expression "gases," when used in the present specification, is meant to denote both gases and vapors.

By a process for the selective removal of hydrogen sulfide is meant a process in which the percent removal of $H_2S$ is larger than that of $CO_2$. If selective $H_2S$ removal is required, it is obviously preferable that the ratio between these two percent removals should be as high as possible.

Processes for the selective removal of hydrogen sulfide from substantially water-immiscible gases that contain both hydrogen sulfide and carbon dioxide and possibly one or more other components in which the selectivity is based on difference in absorption velocity of $H_2S$ and $CO_2$ and ensured by reducing the contact time between the gas and the absorption liquid to a sufficient extent, are well-known.

These known processes have a number of serious drawbacks.

In the first place it is obvious that at the short contact times required to ensure a sufficient degree of selectivity the removal percentages remain rather low. Secondly the degree of selectivity, even at low contact times, is rather low for many absorption liquids. Thirdly, the flexibility of the process is very limited, because reduction of the gas load on a given adsorption device immediately increases the contact time with consequent lowering of the selectivity. It is an object of the present invention to improve the selectivity of absorbant solutions. It is a particular object to improve the selectivity of absorbant solutions for $H_2S$ relative to $CO_2$. Other objects will become apparent during the following detailed description of the invention.

Now, in accordance with this invention, it has been found that a selective removal of $H_2S$ (relative to $CO_2$) may be realized by employing as absorption liquid or as final absorption liquid an aqueous solution of one or more di-propanolamines modified with a bis(hydroxypropyl) ammonium N,N-bis(hydroxypropyl) carbamate in an amount between 0.02 mole and 0.5 mole per mole of dipropanolamine.

Figure 2:
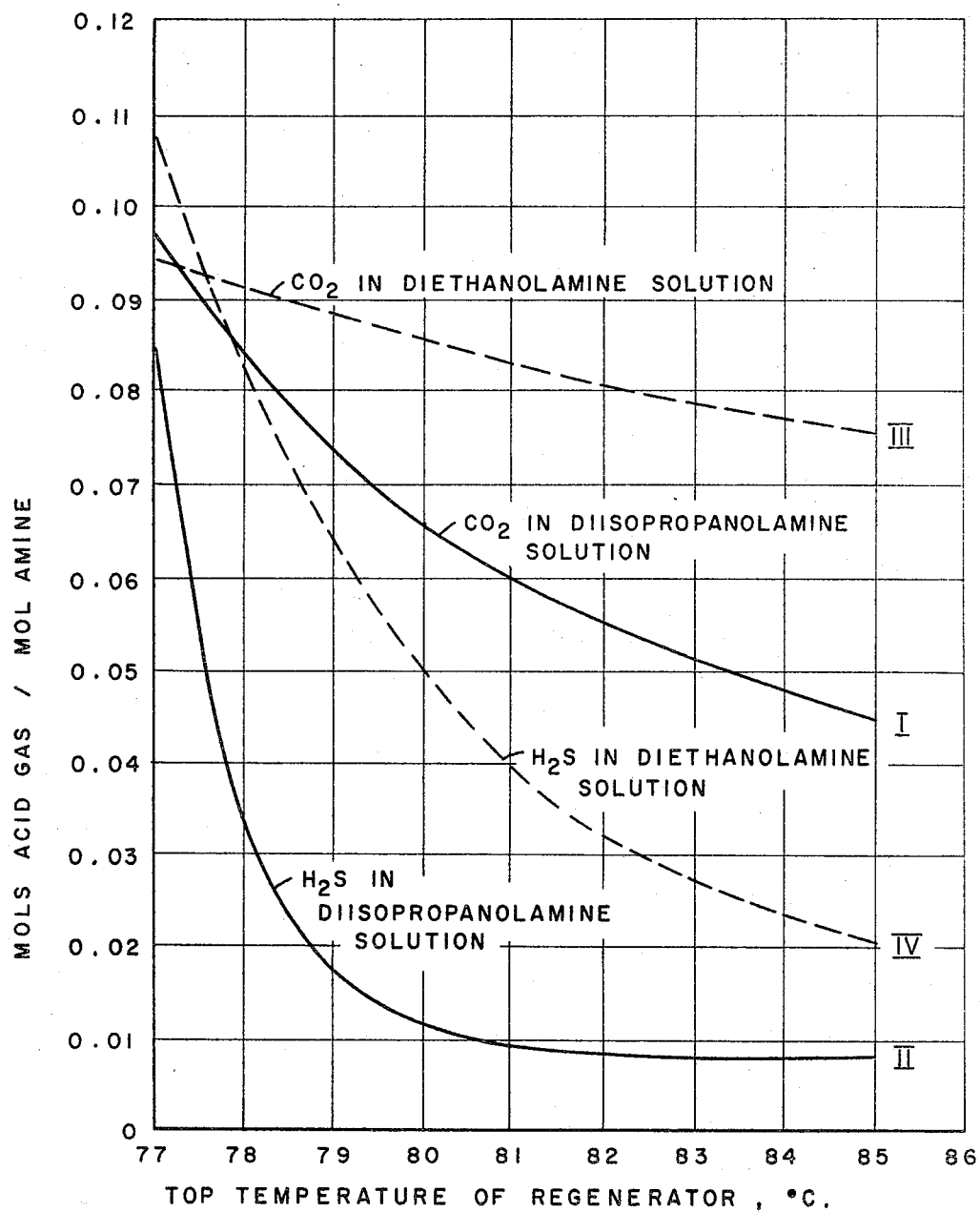

FIGURE 1 is a simplified flow diagram of a system for utilizing the process of the invention; and FIGURE 2 is a graph derived from a process carried out in the system shown in FIGURE 1.

The invention therefore relates to a process for the selective removal of hydrogen sulfide from gases that contain hydrogen sulfide and carbon dioxide and possibly one or more other components, which comprises treating the gas with an aqueous solution containing one or more dipropanolamines, in which solution carbon dioxide is absorbed in an amount between 0.02 mole and 0.5 mole per mole of dipropanolamine.

The aqueous solution containing one or more dipropanolamines is hereinafter also referred to as dipropanolamine phase, dipropanolamine solution or as amine phase.

Dipropanolamines suitable for use according to the invention include the di-n-propanolamine

the n-propanol-isopropanolamine

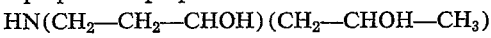

and the di-isopropanolamine $HN(CH_2—CHOH—CH_3)_2$ and mixtures thereof. Di-isopropanolamine in particular has been found suitable, because this substance is easily available in relatively high purity.

In addition to dipropanolamines the amine phase may contain one or more other absorbing agents, such as diethanolamine. For economical reasons technical dipropanolamine mixtures are preferably used in practice, such as obtained as a by-product in the production of diethanolamine. These technical mixtures usually comprise more than 90% by weight of di-isopropanolamine and 10% by weight or less of mono- and tripropanolamines.

The concentration of the aqueous dipropanolamine solution may vary within wide limits. The dipropanolamine content in the solution is generally between 5% and 60% by weight, and particularly between 15% and 35% by weight. The results of the present process may sometimes be improved still further by adding to the aqueous dipropanolamine solution one or more foam depressors.

The amount of $CO_2$ absorbed in the absorption liquid to be used for the treating or the final treating of the gas must be between 0.02 and 0.5 mole per mole of dipropanolamine. The absorption liquid should not contain more than 0.5 mole of $CO_2$ per mole of dipropanolamine, because the absorption capacity for $H_2S$ would otherwise be too low. The $CO_2$ content of the liquid should, on the other hand, not be below 0.02 mole per mole of dipropanolamine, because otherwise the selectivity is impaired.

The $CO_2$ content of the absorption liquid is preferably at least about 0.025 mole per mole of dipropanolamine, because this value is readily attained in regeneration and further reduction does not result in any appreciable reduction of the $H_2S$ content of the absorption liquid as will be discussed below in more detail.

The preferred upper limit for the $CO_2$ concentration in the absorption liquid to be used for the present process is 0.3 mole per mole of diisopropanolamine.

It is understood that most of the carbon dioxide in the aqueous solution is not in the free state, but in the form of the carbamates of the amines present, although preformed carbamates of the same or different dipropanolamines may be added to the amine solution.

The weight ratio used of the dipropanolamine phase to the gas phase to be treated is highly dependent on the convent of hydrogen sulfide and carbon dioxide in the gas. In practice this ratio will generally be between 0.1 and 20 and usually between 2 and 10.

It is advantageous although not necessary to contact the gases to be treated with the dipropanolamine solution at elevated pressure, e.g., 50–1000 p.s.i.g. In this case the smaller gas volume will make it possible to use a contact apparatus of smaller dimensions. A second advantage is that the passage of the hydrogen sulfide into the amine phase is improved by the increased partial pressure of these compounds in the gas.

The temperature at which the process according to the invention is carried out is generally in the range of from 0 to 140° C., and preferably 15° C. to 90° C.

In a multi-stage process it may be beneficial to use a temperature gradient, the temperature being highest in the stage in which the gas to be treated is mixed with dipropanolamine solution for the first time.

It is well-known to regenerate an aqueous absorption liquid that has been used for absorption of $H_2S$, $CO_2$ and possibly other acid components from a gas by boiling and/or steam-stripping such a "fat" solution, yielding a "lean" solution and a gas consisting of hydrogen sulfide, $CO_2$ and possibly other components.

The efficiency and economy of this method depends mainly on the amount of acidic components which can be absorbed into the aqueous solution per cycle, because the amount of solution which has to be circulated is inversely proportional to the amount of acidic components absorbed, and the quantity of total heat necessary for the regeneration operation is dependent mainly on the amount of solution which must be circulated.

In order to increase the amount of acidic components dissolved in the solution per cycle, it is customary to contact the gas containing hydrogen sulfide and the aqueous solution in a countercurrent system in which the lean solution contacts the exit gas which has been scrubbed of substantially all its hydrogen sulfide content, and the fat solution, just before regeneration, contacts the entering fluid, rich in hydrogen sulfide. Such countercurrent contacting is, in general, effected in a scrubbing tower containing suitable contact means, such as bubble caps or Raschig rings. The hydrogen sulfide-containing gas is introduced at the bottom of the tower and is withdrawn purified at the top of the tower, while the lean solution is introduced at the upper part and is withdrawn loaded with hydrogen sulfide at the bottom.

Other methods designed to extend the amount of acidic components absorbed per cycle and improve purification of the exit gas comprise, for example, the separation of the lean solution into two streams, one of which is further regenerated to become "a very lean stream" which should have a $CO_2$ content within the range of from 0.03 to 0.5 mole per mole of dipropanolamine, and which is introduced near the top of the scrubbing tower, while the remaining lean stream, which has been regenerated less intensely, is introduced at a lower point.

The regeneration may be effected, for example, by introducing the amine solution at a temperature of from 40° C. to 130° C., preferably from 80° C. to 120° C. in a regenerator. In this regenerator the components absorbed from the gases treated and/or the hydrolysis products formed are stripped by the steam evolving from the boiling solution. This treatment may be very suitably carried out by indirect low-pressure steam-heating of the solution to be regenerated, whereby the hydrogen sulfide, carbon dioxide, etc., absorbed are effectively evaporated. Additional steam from an outside source may also be used.

The required concentration of carbon dioxide may be maintained by several methods as is more fully explained with reference to the accompanying drawings.

FIGURE 1 shows a system comprising a bubble-cap tower 1, which acts as the absorber and into which the "lean" absorbing liquid is introduced through line 2, and the gas containing hydrogen sulfide and carbon dioxide by line 3, while the "fat" solution is withdrawn through line 4, and the purified gas through line 5. The fat solution is passed through heat exchanger 6 and subsequently introduced into the upper part of the bubble-cap tower 7, in which tower the fat solution is regenerated and from which the lean solution is withdrawn at the bottom through line 2. The tower 7 is provided with a reboiler 8 and a condenser 9 to permit proper stripping of the fat solution by heat and evaporation. Moreover, live steam is introduced into the lower part of the tower via a line 10. The top vapors containing mainly hydrogen sulfide, carbon dioxide and steam are passed through the condenser 9 and the resulting mixture is passed via a line 11 to a gas-liquid separator 12. A gas stream mainly consisting of $H_2S$ and $CO_2$ leaves this separator through a line 13 and may be used for any desired purpose such as the manufacture of sulfur, sulfuric acid or liquid hydrogen sulfide, or may be discarded, if preferred. The liquid leaving the separator 12 through a line 14 is recycled to the top of the tower 7 via a line 15 and/or combined with the lean solution by diverting it via a line 16 to the line 2.

Now according to the present invention the presence of carbon dioxide in the lean solution must be ensured in specific quantities.

Thus, carbon dioxide may be introduced from an outside source via lines 17 and 18 into the line 2 containing the lean solution and in that case the mixture is preferably passed through a time tank 19 to allow for complete dissolution of the gas. It may also be introduced via a line 20 into the line 16, through which condensed water from the separator 12 is passed to the line 2, and which may also be provided with a time tank 21 so that carbon dioxide is fully dissolved in the water before the latter is mixed with the lean solution emerging from the bottom of the tower 7 which implies that this lean solution itself need not pass through a time tank.

According to the particularly preferred method of carrying out the process according to the invention no carbon dioxide from outside sources is used but the fat solution is regenerated in such a way that the lean solution entering the tower 1 contains an amount of $CO_2$ within the limits prescribed.

This method is particularly preferred because in the case of dipropanolamines this regeneration is very simple and efficient. This will be elucidated with reference to FIGURE 2, which is a graphical representation of the $H_2S$ and $CO_2$ contents of regenerated lean amine solutions (indicated on the vertical axis as moles $H_2S$ or $CO_2$ per mole of amine) as a function of the top temperature in the regenerator (indicated on the horizontal axis in degrees centigrade). The graph holds for an average regenerator pressure of 0.18 kg./cm.$^2$ gauge, for amine concentrations of 1.5 moles per m.$^3$, for incoming "fat" solutions containing 0.8 mole of $H_2S+CO_2$ per mole of amine and for a regenerator provided with 18 bubble-cap trays. The flow scheme used was that according to FIGURE 1 with the omission of the lines and vessels indicated with the reference numbers 16 to 21, inclusive.

The curve I represents the $CO_2$ contents of regenerated diisopropanolamine solutions and curve II the $H_2S$ contents of such solutions, while for comparison curves III and IV represent the $CO_2$ and $H_2S$ contents respectively of regenerated diethanolamine solutions. This figure illustrates the surprising fact that the curve for the $H_2S$ content of regenerated diisopropanolamine solutions first had a very steep slope and then rather abruptly changes to a very weak slope, the $H_2S$ content in the region of the weak slope being extremely low. In the region of the weak slope of curve II, the curve I of the $CO_2$ contents shows a steep slope and only a slight curvature and is moreover situated at a much higher position. This shows that it is possible and in fact very easy to regenerate in such a way that the $H_2S$ content is very low (less than about 0.01 mole per mole of amine) while the $CO_2$ content remains rather high, this content being in the range necessary for selective operation. From the graph it is clear that the $CO_2$ content of the lean solution should preferably be about 0.06 mole/mole or somewhat lower because at this value and therebelow very low $H_2S$ concentrations are obtained, while operating at still lower $CO_2$ concentrations only requires higher temperatures (i.e., more caloric energy) and moreover lowers the selectivity of the absorption operation. A comparison of curves I and II with curves III and IV immediately reveal that such a simple and attractive regeneration is not possible for diethanolamine.

When other conditions than those listed above are applied, the actual position of the various curves in the concentration versus top temperature graph may be slightly different from those given in FIGURE 2, but the qualitative picture remains essentially the same.

The exact regeneration conditions which must be applied for obtaining a lean solution containing the correct proportion of $CO_2$ depend greatly upon the operation of the particular system, i.e., of the conditions of the stripping operation, the number of stages, the temperature and pressure at which operation is conducted, the composition of the fat solution, etc. These quantities cannot be readily predicted beforehand but can easily be ascertained by conventional adjusting of the operating conditions and therefore need not be further specified here.

The present absorbents in addition to being very selective have a number of other important advantages over other absorbents.

Thus, as indicated by the data in FIGURE 2, in the regeneration of a spent dipropanolamine solution fewer calories have to be applied than in the regeneration of a corresponding spent diethanolamine solution to the same $H_2S$ concentration. It was further found that the present absorbents have a larger absorption performance with respect to acidic compounds than diethanolamine so that a smaller amount of absorption liquid is required. A practical test showed that from a certain gas 1 mole of hydrogen sulfide+carbon dioxide may be absorbed per 5 moles of diethanolamine whereas only 3 mols of di-isopropanolamine were required under otherwise comparable conditions.

A very important advantage resides in the fact that $H_2S$ removal is so much more complete than with other well known absorbents. Thus, from a given stream, containing any amount of $H_2S$ a product gas with a $H_2S$ content of 0.5 part by volume per $10^6$ parts by volume of gas or less can easily be realized, while with the use of diethanolamine or monoethanolamine under comparative conditions final products with about 100 parts by volume per $10^6$ parts by volume of gas $H_2S$ are obtained. A practical remedy in such a case was a caustic wash after the diethanolamine or monoethanolamine treatment, but such a caustic wash is inherently costly and becomes even more so in the processing of $CO_2$ containing gases because the $CO_2$ also consumes caustic. Another remedy was the application of "split-flow" which is, however, also rather costly. With the use of the present absorbers caustic washes and split-flow schemes can usually be omitted.

Moreover, no corrosion troubles have been experienced even with high $H_2S$ and $CO_2$ loadings, e.g., up to 0.9 mole $H_2S+CO_2$ per mole of dipropanolamine.

The invention may be illustrated by the following example:

Example I

A gas consisting of hydrogen and light hydrocarbons ($C_1$–$C_3$) and containing 3.6% by volume of hydrogen sulfide and 1.1% by volume of $CO_2$ and having a temperature of 14° C. and a pressure of 10.5 atmospheres absolute was continuously introduced into the bottom of a column having a diameter of 1.1 m. and a length of 15.5 m. and provided with 21 bubble-cap trays.

A 19% aqueous solution of a technical di-isopropanol amine consisting of 94% by weight of di-isopropanolamine, 4% by weight of monopropanolamine and 2% by weight of tripropanolamine was continuously introduced near the top. This lean solution contained 0.06 mole of $CO_2$ and 0.0077 mole of $H_2S$ per mole of di-isopropanolamine. Its temperature was 32° C.

The actual ratio by volume of the gas introduced to the dipropanolamine solution was 20, an overall quantity of 74 tons of gas and 210 tons of di-isopropanolamine solution being passed into the column per twenty-four hours.

The gas discharged at the top of the column at a temperature of 23° C. had a hydrogen sulfide content of less than 1 part by volume of $H_2S$ per $10^6$ parts by volume of gas, and a $CO_2$ content of 0.5% by volume.

This shows the approximately 99.997% of the hydrogen sulfide and approximately 55% of the $CO_2$ were removed from the gas.

With the use of an aqueous diethanolamine solution, the conditions remaining otherwise unchanged, 99.90% of the hydrogen sulfide and 90% of the $CO_2$ are removed from the gas.

The di-isopropanolamine solution running off the absorption column, containing 0.75 mole hydrogen sulfide+carbon dioxide per mole di-isopropanolamine, was continuously supplied to the top of a regeneration column at a slight superatmospheric pressure (0.15 atm. gauge). This column had a diameter of 1.6 m. and a height of 17.2 m. and contained 18 bubble-cap trays, the bottom temperature being maintained at 104° C. by means of indirect heating with steam, resulting in a top temperature of 81° C. At this temperature the diisopropanol solution is boiling and the components absorbed from the gas are stripped with the steam evolving from the boiling solution. With an amount of 1.75 kilograms of total steam per kilogram of acid gases expelled over the top of the column the diisopropanolamine solution running off the bottom contained 0.0077 mole hydrogen sulfide and 0.06 mole carbon dioxide per mol diisopropanolamine. This solution was recycled to the process after being cooled by means of heat exchangers. The hydrogen sulfide concentration of the stripped gas passing off at the top of the regeneration column is such that it can be processed without any further treatment in a sulfur recovery plant.

In the regeneration of a corresponding spent diethanolamine solution to the same $H_2S$ concentration an amount of 2.8 kilograms of total steam per kilogram of acid gases expelled over the top of the column had to be applied.

We claim as our invention:

1. A process for the selective absorption of $H_2S$ from a normally gaseous mixture containing $H_2S$ and $CO_2$ comprising:
  (a) contacting said normally gaseous mixture with an aqueous absorbent solution of a dipropanolamine whereby a substantial portion of the $H_2S$ and $CO_2$ are selectively absorbed therein;
  (b) heating said absorbent solution containing a substantial proportion of $H_2S$ and $CO_2$ to a temperature of from about 40° C. to 130° C., to partially regenerate said solution while maintaining 0.02–0.5 mole of bis(hydroxypropyl)ammonium N,N-bis(hydroxypropyl)carbamate per mole of dipropanolamine in the absorbent solution, whereby the selectivity of said absorbent solution for $H_2S$ is increased relative to $CO_2$; and
  (c) recycling the partially regenerated solution for the selective absorption of $H_2S$ by contacting as in (a).

2. A process in accordance with claim 1 wherein the aqueous solution contains 5–60% by weight of dipropanolamine and the contacting occurs at a temperature of 0–140° C. and a pressure of 50–1000 p.s.i.g.

3. A process in accordance with claim 1 wherein the dipropanolamine is diisopropanolamine and the partial regeneration is performed so as to maintain 0.025–0.3 mole of bis(hydroxypropyl)ammonium N,N-bis(hydroxypropyl)carbamate per mole of diisopropanolamine in the absorbent solution.

4. A process in accordance with claim 1 wherein said carbamate is formed by the reaction of $CO_2$ and dipropanolamine.

References Cited by the Examiner

UNITED STATES PATENTS

| 1,783,901 | 12/1920 | Bottoms | 23—2.3 |
| 2,608,461 | 8/1952 | Frazier | 23—2 |
| 3,098,705 | 7/1963 | Bally | 23—3 |

OSCAR R. VERTIZ, *Primary Examiner.*

MAURICE A. BRINDISI, *Examiner.*

E. C. THOMAS, *Assistant Examiner.*